United States Patent
Querro et al.

(10) Patent No.: US 8,500,144 B2
(45) Date of Patent: Aug. 6, 2013

(54) INTERLOCKING FASTENED SCOOTER HEAD TUBE

(75) Inventors: Paul Douglas Querro, Fall City, WA (US); John Charles Querro, Fall City, WA (US)

(73) Assignee: VERTX Industries LLC, Fall City, WA (US)

( * ) Notice: Subject to any disclaimer, the term of this patent is extended or adjusted under 35 U.S.C. 154(b) by 0 days.

(21) Appl. No.: 13/222,690

(22) Filed: Aug. 31, 2011

(65) Prior Publication Data

US 2012/0049476 A1    Mar. 1, 2012

Related U.S. Application Data

(60) Provisional application No. 61/378,439, filed on Aug. 31, 2010.

(51) Int. Cl.
*B62M 1/00*    (2010.01)

(52) U.S. Cl.
USPC ............... 280/87.041; 280/87.021; 280/87.05

(58) Field of Classification Search
USPC ............... 280/87.01 M, 87.01, 87.021, 87.03, 280/87.041–87.043, 87.05, 63
See application file for complete search history.

(56) References Cited

U.S. PATENT DOCUMENTS

| | | | | |
|---|---|---|---|---|
| 4,799,701 A * | 1/1989 | Lindau et al. | ............ | 280/87.041 |
| 5,135,243 A * | 8/1992 | Carpenter | ................... | 280/7.14 |
| 6,158,751 A * | 12/2000 | Wu et al. | ................... | 280/87.041 |
| 6,168,175 B1 * | 1/2001 | Lan | ............ | 280/87.041 |
| 6,182,988 B1 * | 2/2001 | Wu | ................... | 280/87.05 |
| 6,193,248 B1 * | 2/2001 | Liu | ................... | 280/87.041 |
| 6,217,058 B1 * | 4/2001 | Wang et al. | ................ | 280/655.1 |
| 6,234,501 B1 * | 5/2001 | Chen | ........................ | 280/87.041 |
| 6,244,605 B1 * | 6/2001 | Liu | ............ | 280/87.041 |
| 6,260,866 B1 * | 7/2001 | Cheng | ........................ | 280/87.05 |
| 6,276,701 B1 * | 8/2001 | Chen | ........................ | 280/87.05 |
| 6,283,485 B1 * | 9/2001 | Tsai | ........................ | 280/87.05 |
| 6,286,845 B1 * | 9/2001 | Lin | ............ | 280/87.05 |
| 6,305,698 B1 * | 10/2001 | Liang | ........................ | 280/87.041 |
| 6,305,869 B1 * | 10/2001 | Chen | ........................ | 403/109.5 |
| D454,599 S * | 3/2002 | Chen | ........................ | D21/423 |
| 6,378,880 B1 * | 4/2002 | Lin | ............ | 280/87.05 |
| D457,574 S * | 5/2002 | Chen | ........................ | D21/423 |
| 6,382,366 B1 * | 5/2002 | Chang | ........................ | 188/29 |
| 6,435,528 B1 * | 8/2002 | Tsai | ........................ | 280/87.041 |
| D463,508 S * | 9/2002 | Stroppiana | ................... | D21/423 |
| 6,443,470 B1 * | 9/2002 | Ulrich et al. | ............. | 280/87.041 |
| 6,446,981 B1 * | 9/2002 | Wise et al. | ................... | 280/7.17 |
| 6,805,368 B1 * | 10/2004 | Chen | ........................ | 280/87.041 |
| 6,923,459 B2 * | 8/2005 | Yeo et al. | ................. | 280/87.041 |
| D556,838 S * | 12/2007 | Ming | ........................ | D21/423 |
| 7,419,171 B1 * | 9/2008 | Ka Ming | ................... | 280/87.041 |
| 7,487,982 B2 * | 2/2009 | Chan | ........................ | 280/87.01 |
| 7,584,974 B2 * | 9/2009 | Jackman et al. | ........... | 280/87.05 |
| 7,976,035 B2 * | 7/2011 | Chan | ........................ | 280/87.05 |
| 8,113,525 B2 * | 2/2012 | Lin | ............ | 280/87.041 |

(Continued)

*Primary Examiner* — J. Allen Shriver, II
*Assistant Examiner* — Travis Coolman
(74) *Attorney, Agent, or Firm* — Timothy E. Siegel Patent Law, PLLC; Timothy E. Siegel

(57) ABSTRACT

A modular interlocking design for a scooter. The present invention introduces a design for a scooter providing modular parts of a scooter that allows for easy assembly. The detent design of the present invention also provides for stronger joints unlike the traditional scooter with weak and brittle welded joints.

12 Claims, 2 Drawing Sheets

U.S. PATENT DOCUMENTS

| | | | |
|---|---|---|---|
| 2002/0074756 A1* | 6/2002 | Tsai | 280/87.041 |
| 2002/0084612 A1* | 7/2002 | Yeung | 280/87.041 |
| 2002/0108798 A1* | 8/2002 | Huntsberger et al. | 180/220 |
| 2002/0167145 A1* | 11/2002 | Lin | 280/87.041 |
| 2005/0139406 A1* | 6/2005 | McLeese | 180/180 |
| 2006/0049595 A1* | 3/2006 | Crigler et al. | 280/87.042 |
| 2008/0203691 A1* | 8/2008 | Hsu | 280/87.041 |
| 2011/0241302 A1* | 10/2011 | Lovley et al. | 280/87.041 |

* cited by examiner

INTERLOCKING FASTENED SCOOTER HEAD TUBE

The current application claims a priority to the U.S. Provisional Patent application Ser. No. 61/378,439 filed on Aug. 31, 2010.

FIELD OF THE INVENTION

The present invention relates generally to a scooter with an interlock mechanism between a head tube and scooter deck. It is the objective of the present invention to introduce a new interlocking mechanism that is releasable.

BACKGROUND OF THE INVENTION

Traditionally, the deck and the head tube on scooters have been permanently connected by means of welding. Other methods include the use of welding brackets, in which the head tubes are connected to. The welding of the head tube to the scooter deck creates a several problems. To keep the weight of the entire scooter light yet durable, scooter parts are generally made from aluminum. However, the welding between aluminum parts generally creates weak and brittle joints. The week joints often fail under high stress conditions. The manufacturing process of welding the scooter parts together also results in the increased product cost for end users. When parts are damaged, the end users are forced to replace components that may not be damaged. The manufacturers are also limited on the materials used due to the limited number of materials that can be welded together. The present invention introduces a scooter head tube and deck interlocking mechanism that holds the two parts together with a removable fastener.

DETAIL DESCRIPTIONS OF THE INVENTION

Figure 1:
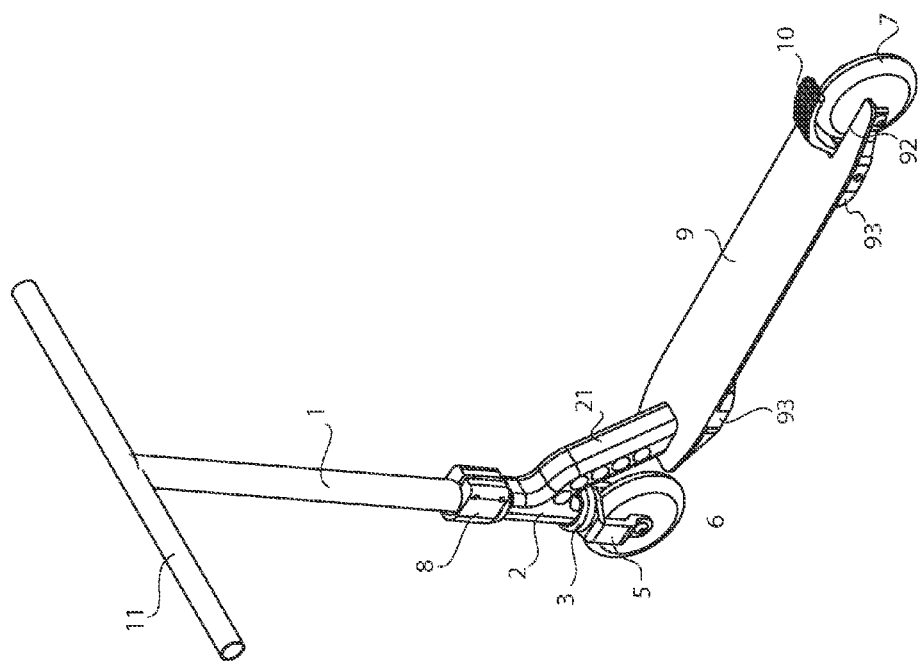
FIG. 1 is a perspective view of the scooter making use of the present invention.

All illustrations of the drawings are for the purpose of describing selected versions of the present invention and are not intended to limit the scope of the present invention.

The present invention introduces a new scooter design that provides a modular interlocking mechanism between the head tube 2 and the deck 9. This design provides a user with a stronger scooter with stronger joints with lower chances of joint failure. In addition, with modular interlocking components, the users are able to easily replace parts at minimal costs. The scooter of the present invention comprises a handle bar 1, a head tube 2, a headset bearing 3, a mount bolt 4, a wheel bracket 5, a front wheel 6, a rear wheel 7, a clamp 8, a deck 9, and a brake 10.

In reference to FIG. 1, the head tube 2 comprises a deck arm 21, a detent notch 22, and a handle channel 23. The deck 9 comprises a recessed mount 91, a rear wheel slot 92, and an under deck support 93. The head tube 2 is the component of the present invention that connects the handle bar 1 to the deck 9. The head tube 2 provides the handle bar 1 with the ability to pivot and the user with the ability to control the direction of the front wheel 6. The deck 9, being the main body of the scooter, provides the user with a platform to stand on while gliding.

Figure 2:
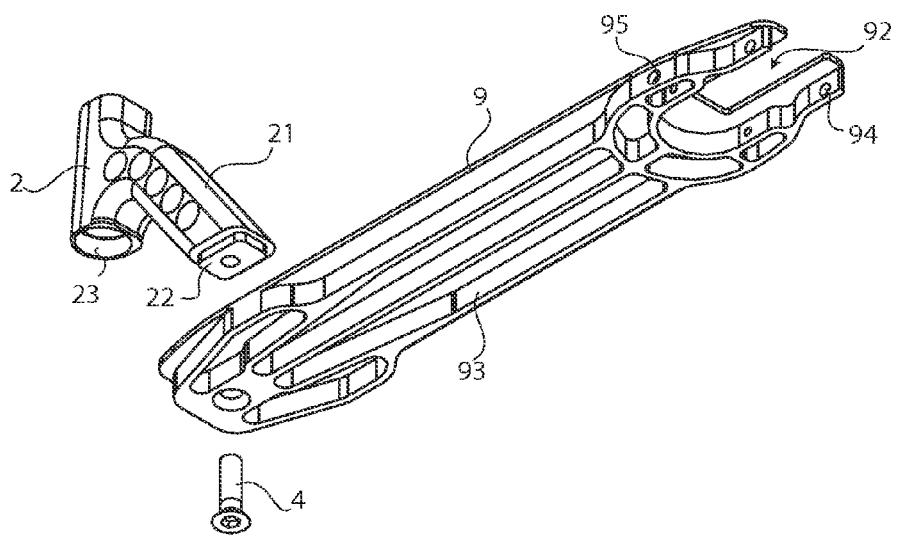
FIG. 2 is a bottom explosion view of the present invention on a deck of a scooter.
Figure 3:
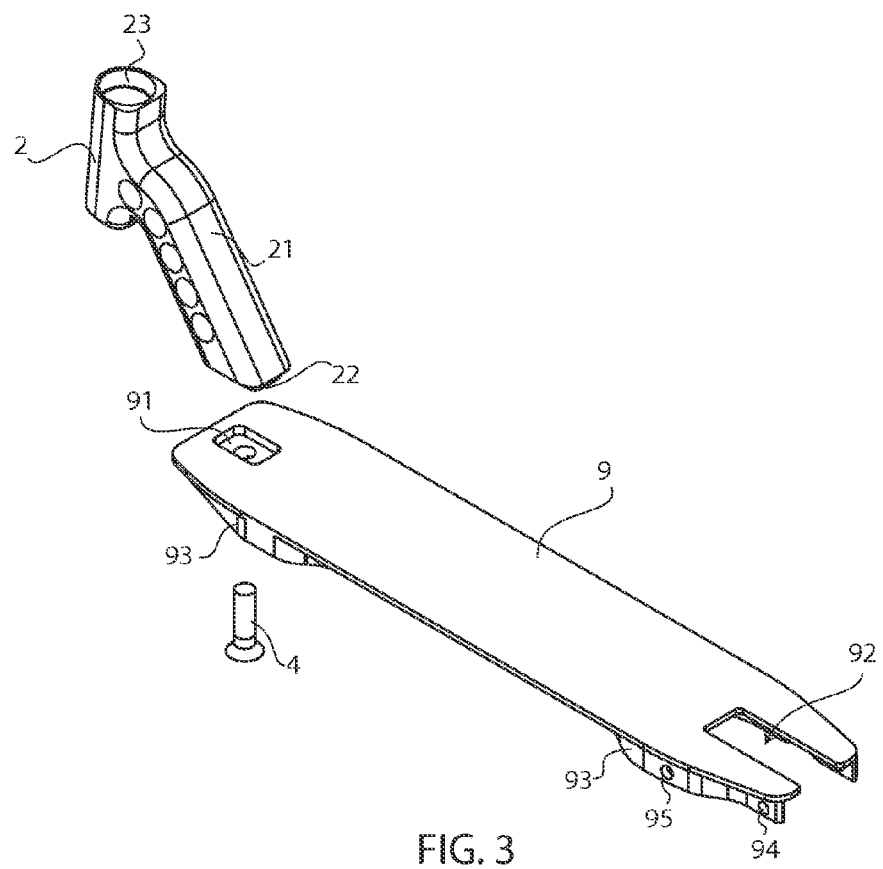
FIG. 3 is a perspective explosion view of the present invention on a deck of a scooter.

In reference to FIG. 2 and FIG. 3, the recessed mount 91 is a recessed spaced on the top front end side of the deck 9. In the preferred embodiment of the present invention, the recessed mount 91 is a non-circular shaped space. The rear wheel slot 92 is a slot on the rear end of the deck 9 to provide space to fit the rear wheel 7. The under deck support 93 is a frame positioned on the bottom surface of the deck 9. The under deck support 93 further comprises a rear wheel mount 94 and a brake mount 95. The rear wheel mount 94 is a pair of holes that are laterally traversed through the under deck support 93 adjacent to the rear end of the deck 9. The rear wheel 7 is jointly fastened to the rear wheel mount 94. The brake mount 95 is a pair of holes that are laterally traversed through the under deck support 93 adjacent to front end of the rear wheel slot 92. The brake 10 is jointly fastened to the brake mount 95 and extends over the rear wheel 7. To prevent the brake 10 from resting on the rear wheel 7, the joint connection between the brake 10 and the brake mount 95 includes a spring actuator. The spring actuator keeps the brake 10 in a normally up position away from the rear wheel 7.

The handle channel 23 is a hollow channel that is traversed through the length of the head tube 2. The handle channel 23 provides the handle bar 1 a space to traverse through. The deck arm 21 is an extension from the head tube 2 that connects to the deck 9. The deck arm 21 is downwardly angled and extended from the head tube 2. On a mounting end of the deck arm 21 is positioned the detent notch 22. The detent notch 22 is a protrusion from the end of the deck arm 21 that is shaped correspondingly to the recessed mount 91. The non-circular shape of the detent notch 22 and the recessed mount 91 provides the head tube 2 and the deck 9 a non-pivoting interlocking connection. The deck arm 21 is secured to the deck 9 by means of the mount bolt 4. More specifically, the detent notch 22 is inserted and fastened to the recessed mount 91 by the mount bolt 4. The mount bolt 4 engages the detent notch 22 from the bottom side of the deck 9 to ensure secure connection.

In reference to FIG. 1, the handle bar 1 further comprises of handles 11. The handles 11 are connected in perpendicular relationship to the top end of the handle bar 1 and provide the handle bar 1 with a "T" shape. The handles 11 allow the users to pivot the handle bar 1 for directional control. The handle bar 1 traverses through the handle channel 23 of the heat tube and extends out a wheel end of the handle channel 23. The wheel bracket 5 is fastened to the bottom end of the handle bar 1 with the two wheel bracket 5 prongs arranged downwards. The front wheel 6 is jointly fastened to the wheel bracket 5 and is leveled with the rear wheel 7. The headset bearing 3 is positioned in between the wheel bracket 5 and the head tube 2 in concentric relationship to the handle bar 1. The head set bearing provides a low friction surface to surface contact between the head tube 2 and the wheel bracket 5. The low friction contact provides the user with easier steering of the scooter. To fasten the head tube 2 to a fixed position on the handle bar 1, the clamp 8 is concentrically fastened to the handle bar 1 adjacent to the head tube 2. This connection ensures that the head tube 2 does not slide up and down the handle bar 1 while the user is riding the scooter.

The modular design allows a user to easily replace individual parts on the scooter. For example, if the head tube 2 is cracked, the user will simply release the clamp 8, the mounting bolt, and the wheel bracket 5 from the handle bar 1 to completely remove the broken head tube 2. The user is then able to purchase a new head tube 2 and re-assemble the components together for a fully functional scooter. For conventional scooters, the head tube 2 may be welded onto the deck 9. As a result, the users are forced to replace both the deck 9 and the head tube 2 together. By providing individual modular components, the present invention also reduced the cost of manufacturing scooters.

Although the invention has been explained in relation to its preferred embodiment, it is to be understood that many other possible modifications and variations can be made without departing from the spirit and scope of the invention as hereinafter claimed.

What is claimed is:

1. An interlocking fastened scooter head tube and scooter deck assembly having a top and bottom defined by orientation during ordinary use, comprising,
   a head tube assembly that includes a head tube defining a handle channel and a deck arm joined to the head tube at a junction and extending diagonally downwardly from the junction and having a deck-contacting surface, which has a boss having a bottom surface, side surfaces, and defining an upwardly extending threaded opening side surfaces
   a deck having a top surface and including a recessed mount in the form of an indentation in the top surface having a bottom wall defining an aperture and having a top surface, and side surfaces and matingly retaining the boss, with a threaded fastener inserted upwardly and extending through the aperture and into the threaded opening in the boss, so that the boss bottom surface is pulled by the threaded fastener into abutting engagement with the indentation bottom wall top surface and each of the boss side surfaces abutting an indentation side surface, thereby providing structural support for the boss and the deck arm.

2. The assembly of claim 1, wherein the boss is in the form of a non-circular protrusion, thereby resisting rotation.

3. The assembly of claim 2, wherein the boss is in the form of a rectangular protrusion.

4. The assembly of claim 3, wherein the rectangular protrusion has rounded corners.

5. The assembly of claim 1, wherein the boss has a height of at least 0.5 centimeters and the indentation has a depth of at least one centimeter, thereby providing structural support to the boss and the deck arm.

6. The assembly of claim 1, wherein the threaded opening is in the center of the boss, and the aperture is in the center of the bottom wall.

7. A scooter, comprising:
   a handle bar;
   a head tube assembly, including a head tube defining a handle channel having a headset bearing, rotatably supporting the handle bar and a front wheel fork;
   a deck, defining an upwardly facing indentation having a bottom wall defining an aperture and having a top surface, the indentation also having side surfaces;
   wherein the head tube assembly includes a deck arm joined to the head tube at a junction and extending diagonally downwardly from the junction and terminating in a boss having a bottom surface and side surfaces and sized and shaped to fit into the upwardly facing indentation of the deck and defining an upwardly extending threaded opening, located so as to align with the aperture in the bottom wall of the indentation when the boss in placed into the indentation;
   wherein the deck comprises, a rear wheel slot, and an under deck support; the under deck support comprises a rear wheel mount;
   a rear wheel mounted to the rear wheel mount and a front wheel mounted to the wheel fork; and
   the deck arm being secured to the deck by means of the boss engaging to the upwardly facing indentation and a threaded fastener inserted upwardly and extending through the aperture into the threaded opening and fastened to pull the boss bottom surface into abutting contact to the bottom wall top surface and the boss side surfaces abut the indentation side surfaces, thereby providing structural support for the boss and the deck arm.

8. The scooter of claim 7, wherein the boss is in the form of a non-circular protrusion, thereby resisting rotation.

9. The scooter of claim 8, wherein the boss is in the form of a rectangular protrusion.

10. The scooter of claim 9, wherein the rectangular protrusion has rounded corners.

11. The assembly of claim 7, wherein the boss has a height of at least one centimeter and the indentation has a depth of at least 0.5 centimeters, thereby providing structural support to the boss and the deck arm.

12. The assembly of claim 7, wherein the threaded opening is in the center of the boss, and the aperture is in the center of the bottom wall.

* * * * *